United States Patent

[11] 3,587,822

| [72] | Inventor | Frank F. White Shaker Heights, Ohio |
|---|---|---|
| [21] | Appl. No. | 838,254 |
| [22] | Filed | July 1, 1969 |
| [45] | Patented | June 28, 1971 |
| [73] | Assignee | Automation Development Corporation Mentor, Ohio |

[54] TUBE AND BAR FEEDER
13 Claims, 8 Drawing Figs.

[52] U.S. Cl. .................................................. 198/26, 214/1
[51] Int. Cl. ..................................................... B65g 47/04
[50] Field of Search ........................................... 198/21, 26; 214/1 (P), 1 (P2)

[56] References Cited
FOREIGN PATENTS
817,198  7/1959  Great Britain ................ 198/26

Primary Examiner—Edward A. Sroka
Attorney—McCoy, Greene and Howell

ABSTRACT: A bar feeder having continuous high speed feeding provided by a unique escapement mechanism and hold down rollers which press each bar against the conveyor to effect feeding. The escapement fingers have inclined upper surfaces which lift one bar only from the feed ramp over a fixed stop and push it onto the conveyor. A special arrangement permits the escapement fingers to handle an exceptionally wide range of different diameters. Both the box beam and the feed ramps are supported by rows of jacks to provide instant uniform adjustment.

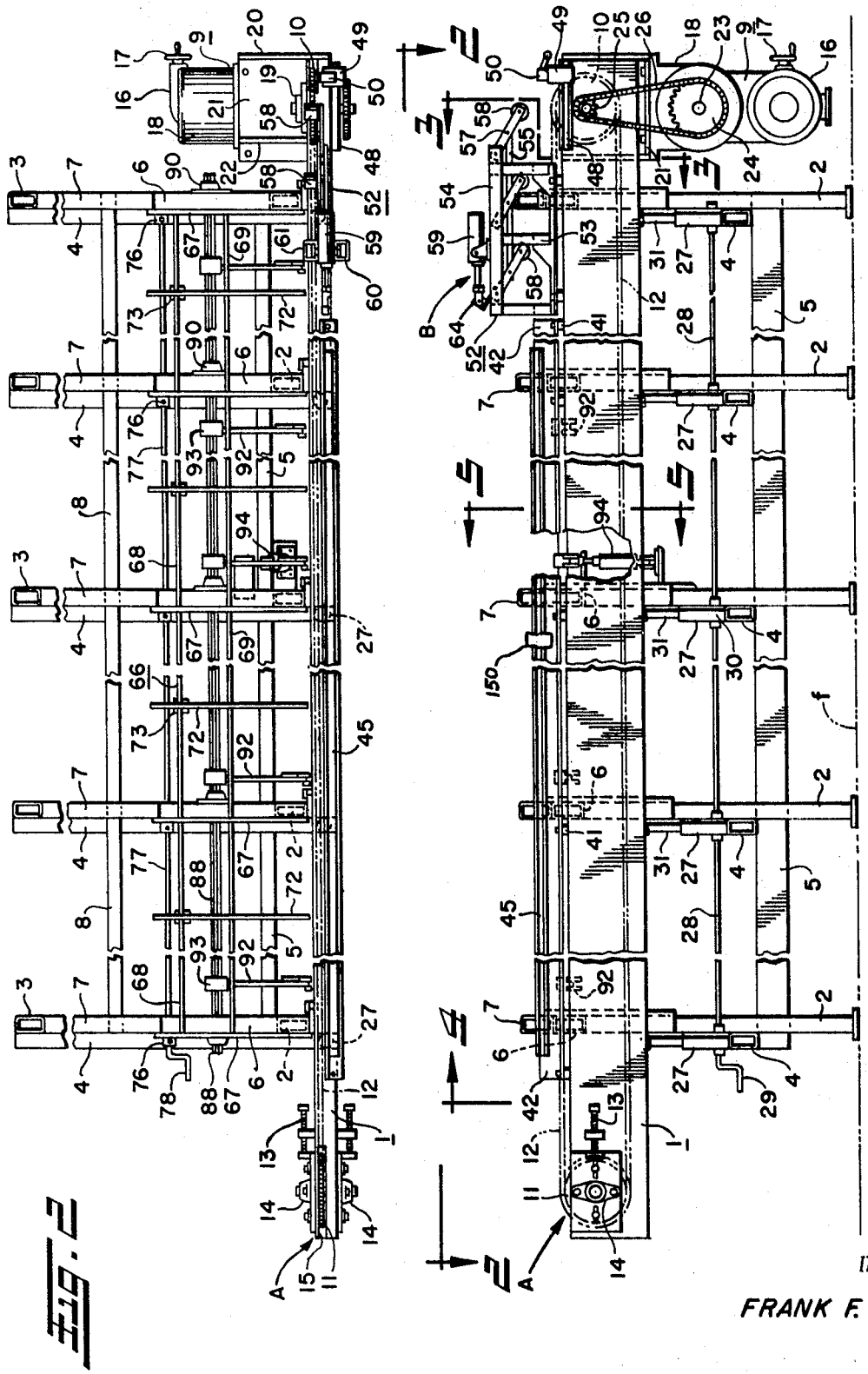

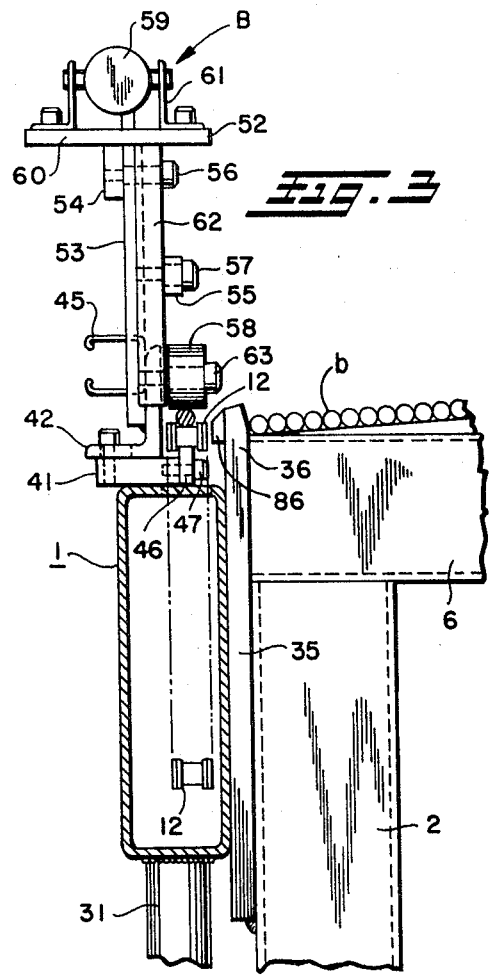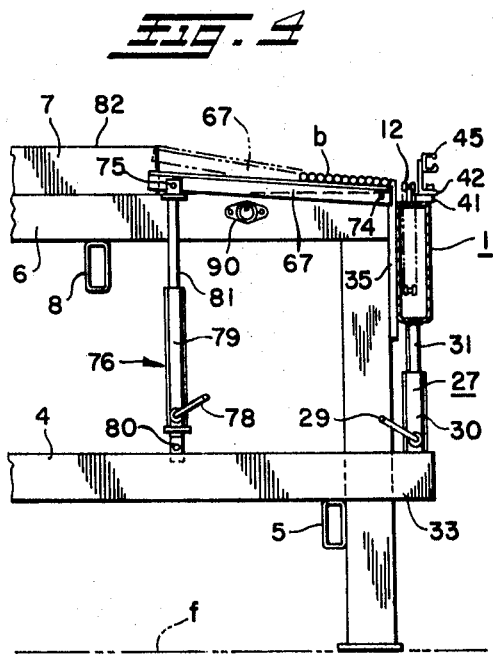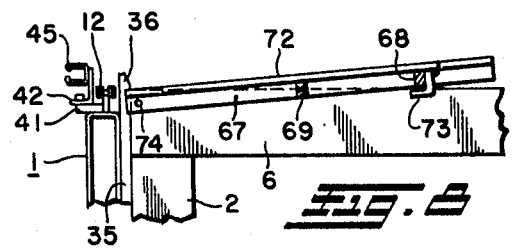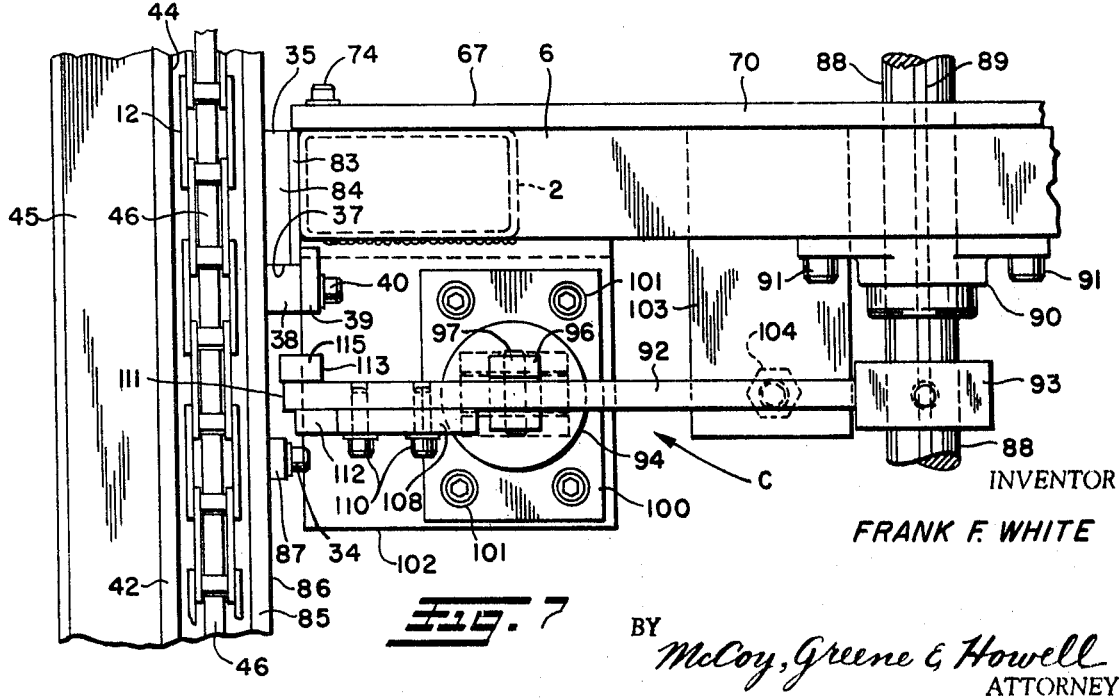

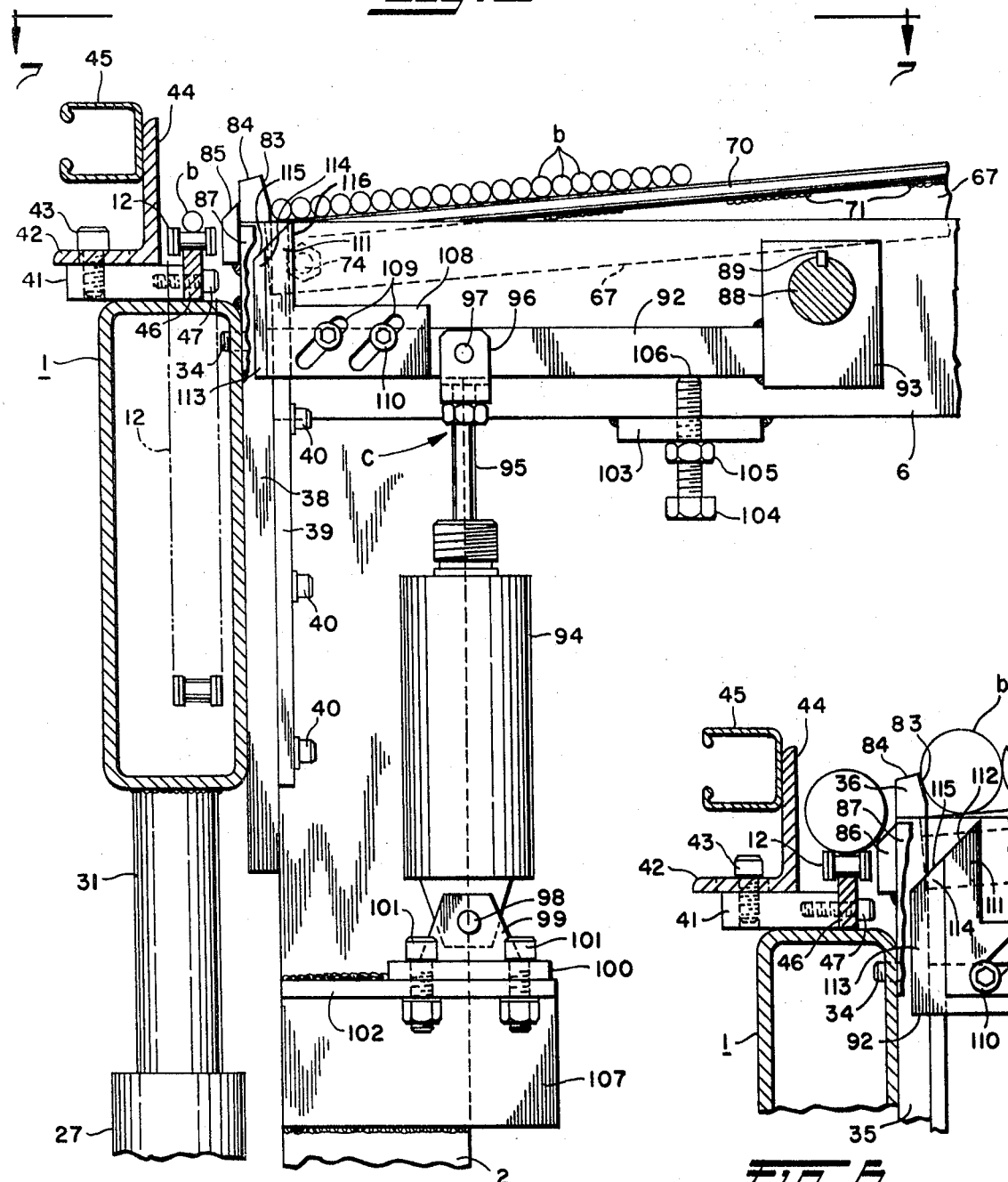

TUBE AND BAR FEEDER

The present invention relates to high-speed bar feeders which may rapidly be adjusted for many different sizes of bars and more particularly to a bar feeder which escapes bars extremely fast, which provides continuous feeding without substantial time delay, and which handles an exceptionally wide range of different diameters.

In certain types of cutting and machining operations, as in an impact shear, for example, it is desirable to maintain a continuous forward feed into the machine without interruptions. Heretofore, substantial amounts of time have been required in conventional bar feeders to escape bars from the feed rack to the conveyor and to effect feeding.

The bar feeder of this invention solves this problem by providing a novel escapement mechanism which includes an inclined feed ramp extending to the edge of the conveyor, fixed stop bars at the end of the ramp, and escapement fingers with inclined surfaces which lift one bar only and push it over the stop bars to the conveyor. The conveyor is driven in one direction only and is provided with holddown rollers operated in conjunction with the escapement fingers which move into engagement with the bar as soon as it is escaped to the conveyor.

The escapement fingers are adjustable for different sizes of bars and have an unusual arrangement which permits the stop members on the feed ramp to be located immediately adjacent the conveyor chain while still permitting an exceptionally wide range of different bar diameters. In this arrangement, the escapement arm is provided with a fixed bar-engaging portion and an adjustable bar-engaging portion which cooperate when escaping large diameter bars. The fixed portion does not interfere with the adjustment for small diameter bars.

The holddown mechanism has a unique construction which minimizes time delay when initiating feeding of the bar including a parallel linkage arrangement which lowers the rollers in unison and provides maximum friction between the bar and the conveyor chain.

A special feed ramp is provided which may be adjusted to different inclinations for different size bars. Instant coordinated adjustment is provided by use of a row of jacks having a common operating shaft.

A novel frame construction reduces the cost of manufacture and permits instant uniform adjustment of the conveyor height. In this construction, a large box beam is provided to enclose the conveyor. Such box beam is the backbone and principal reinforcing element of the frame and is mounted on a row of jacks for quick uniform vertical adjustment.

An object of the present invention is to minimize the time required to escape a bar from a feed ramp to a conveyor and to initiate feeding of that bar on the conveyor.

Another object of the invention is to provide a high speed bar feeder which functions efficiently with a very wide range of bar diameters.

A still further object of the invention is to minimize the time required to adjust a bar feeder when the bar size is changed.

Another object of the invention is to provide a friction bar feed for a conveyor which functions more quickly and more effectively and provides a more positive drive.

These and other objects, uses and advantages of the present invention will become apparent from the following descriptions and claims and from the drawings in which:

FIG. 1 is a foreshortened vertical sectional view on a reduced scale with parts broken away and parts omitted showing a bar feeding apparatus constructed according to the present invention;

FIG. 2 is a foreshortened top view of the bar feeder looking in the direction of the arrows 2-2 in FIG. 1;

FIG. 3 is a fragmentary transverse vertical sectional view taken substantially on the line 3-3 of FIG. 1 but showing the holddown rollers in their lowered positions;

FIG. 4 is a fragmentary transverse vertical sectional view taken on the line 4-4 of FIG. 1 and on a larger scale, the feed ramp being shown in broken lines in its elevated position;

FIG. 5 is a fragmentary transverse vertical sectional view taken on the line 5-5 of FIG. 1 and on a larger scale;

FIG. 6 is a fragmentary vertical sectional view similar to FIG. 5 but showing the parts adjusted to operate with larger diameter bars;

FIG. 7 is a fragmentary top view looking in the direction of the arrows 7-7 in FIG. 5; and FIG. 8 is a fragmentary transverse vertical sectional view on a reduced scale showing details of the feed ramp.

Referring more particularly to the drawings, which are drawn substantially to scale and in which like parts are identified by the same numerals throughout the several views, there is illustrated a main steel frame F which supports a large box beam and an endless chain conveyor A which is mounted on the box beam for vertical adjustment in unison therewith. A holddown assembly B is rigidly and adjustably mounted on the frame F above the box beam and serves to engage a bar or tube on the upper flight of the conveyor chain to assist in feeding.

The frame F has five vertical tubular front legs 2 adjacent the box beam 1 and regularly spaced along the length of the beam and has five vertical rear legs 3 located in longitudinal alignment at the other side of the frame. A tubular transverse member 4 extends between each front leg 2 and the longer rear leg 3 which is aligned therewith. The five members 4 are welded to the front and rear legs and to a longitudinal tubular beam 5 which extends the full length of the frame and is welded to all of the front legs 2.

Five horizontal tubular members 6 are welded to the upper ends of the legs 2 and extend laterally above the members 4 to the rear legs 3. An upper horizontal member 7, with a length more than half of the member 6, is welded to the member 6 to reinforce the same while providing a raised horizontal surface for supporting a row of bars b. The members 6 and 7 are welded to the rear legs 3 in horizontal portions parallel to the members 4 and are also welded to an upper longitudinal tubular member 8 which extends parallel to the member 5 and the full length of the frame.

The endless chain conveyor A is driven by means of a variable-speed drive assembly 9 and has front and rear sprockets 10 and 11 which support a conveyor chain 12 with its upper and lower flights in horizontal positions parallel to the floor f and parallel to the flat upper and lower surfaces of the box beam 1. The tension in the chain may be adjusted by use of adjusting screws 13 which change the position of the sprocket 11 relative to the box beam 1 or by any other suitable adjusting means. As herein shown, the shaft of the rear sprocket 11 is rotatably mounted on the box beam 1 by bearings 14 at opposite sides of the beam, and the sprocket 11 is located within the box beam and projects upwardly through a narrow slot 15 in the rear portion of the box beam. A similar slot is provided in the front portion of the beam to receive the front sprocket 10, which also projects a short distance above the top of the beam. With this construction, the upper portion only of the conveyor is exposed above the box beam.

The drive assembly 9 includes a variable-speed electric motor 16, which is adjusted by an adjusting wheel 17, and a conventional gear reduction unit 18 having a horizontal drive shaft 23 parallel to the shaft of the sprocket 10.

Suitable means are provided for rigidly supporting the drive assembly 9 on the projecting front end portion of the box beam 1 so that the entire assembly 9 is carried by the box beam, for movement vertically in unison therewith. As herein shown, a flat vertical plate 20 is rigidly mounted on the front end of the box beam 1 and is welded to a flat horizontal rectangular plate 21, which is bolted to the housing of the drive assembly 9. A triangular gusset plate 22 is welded to the plate 21 and bolted or otherwise rigidly connected to the box beam on the side of the bearing 19 opposite the plate 20. A bearing 19 is provided on each side of the box beam 1 to provide a rotatably support for the shaft of the front sprocket 10. The plates 20 and 22 are preferably bolted or otherwise detachably connected to the box beam so that they can be removed.

The horizontal drive shaft 23 of the assembly 9 is arranged to drive the sprocket 10. As herein shown a large sprocket 24 is rigidly mounted on the shaft 23 and drives a small sprocket 25 through a drive chain 26. If desired, the assembly 9 may be replaced by other conventional electric, air or hydraulic motor drive units.

The bar feeder of the present invention is unique in that the box beam 1 forming the backbone of the frame is mounted for vertical adjustment relative to the frame F. In order to support the assembly 9, the box beam 1 and the conveyor A, it is necessary to provide heavy-duty lifting means which are capable of maintaining the box beam 1 parallel to the floor $f$. This is most conveniently accomplished by employing a series of manual or fluid-operated jacks engaging the box beam at spaced locations along its length. Such means may be of a type which lifts the beam in response to the turning of a screw. As herein shown there are five screw-type mechanical jacks 27 mounted between the box beam 1 and the transverse supports 4 of the frame F. The five jacks have a common operating shaft 28 and a crank 29 for rotating the shaft. Each jack has an externally cylindrical housing base 30 with a bottom end resting on the projecting end portion 33 of the associated support 4 and has a telescoping lifting rod portion 31 welded to or otherwise connected to the horizontal bottom surface of the box beam 1. Each jack 27 may be of conventional construction with suitable means for raising the portion 31 in response to rotation of the shaft 28. Said shaft extends the full length of the frame F as shown in FIG. 1 and, when rotated, causes all of the jacks to operate in unison so that each jack is moved the same distance and the box beam 1 is moved uniformly and maintained in its horizontal position at all times.

Means are provided on the front legs 2 of the frame F for guiding the box beam 1 vertically as it is raised and lowered by the jacks and for maintaining it in its proper vertical position relative to the frame and the feed rack. As herein shown a relatively thick, flat vertical bar 35 is welded to each leg 2 with its flat outer face in a vertical plane and in engagement with the flat vertical surface of the box beam 1 as shown in FIGS. 3 and 5. The upper portion 36 of each bar 35 projects above the transverse tubular support 6 to provide a stop for limiting rolling of the bars or tubes $b$. The five bars 35 are in longitudinal alignment and hold the box beam 1 straight. The upper portions 36 of the bars are in horizontal alignment.

Each bar 36 has a flat vertical side face 37 which slideably engages the flat side face of an associated narrow vertical bar 38, which is welded to or otherwise rigidly connected to the box beam 1. The five bars 38 thus serve to locate the box beam longitudinally relative to the frame F while permitting vertical sliding movement. A flat vertical guide bar 39, with a width somewhat greater than that of the bar 38, is rigidly and detachably mounted on the associated bar 38 by screws 40 for slidably engaging a narrow face of the associated bar 35 which projects longitudinally beyond the leg 2 and the member 6. The five guide bars 39 thus slidably engage the five bars 35 of the frame F to hold the box beam 1 against the vertical faces of the bars 35 and prevent movement of the beam away from the frame F.

Means are provided on the top of the box beam 1 to support and guide the conveyor chain. As herein shown a series of small metal blocks 41 are welded to the flat horizontal upper metal surface of the box beam 1 at spaced locations along the length of the beam. These are located throughout the length of the beam with a spacing close enough to provide proper support for a large angle 42. The angle is detachably mounted on the blocks 41 by a series of screws 43 which locate the vertical face 44 of the angle in a vertical plane parallel to the vertical faces of the bars 35 and the box beam 1. Such vertical face projects above the upper portions 36 of the bars 35 and serves to prevent large bars from rolling past the conveyor chain.

One or more long channels 45 may be rigidly mounted on the angle 42 to provide supports for adjustable limit switches or the like. A similar short channel 48 is rigidly mounted on the front portion of the box beam 1 adjacent the sprocket 10 to provide a support for a limit switch 50. Such switch is mounted on a supporting plane 49 in different adjusted positions on that channel.

A smooth fat guide bar 46 of uniform width extends substantially the full distance between the sprockets 10 and 11 and is rigidly and detachably mounted on the blocks 41 by screws 47 which extend into said blocks while holding the bar 46 against the horizontal upper surface of the box beam 1. The blocks 41 are in longitudinal alignment and hold the bar 46 parallel to the vertical face 44 of the angle 42. The flat upper surface of the bar 46 is located in a horizontal plane and engages the rollers of the roller chain 12 to support the upper flight of the chain in a horizontal position in alignment with the impact shear, lathe, cutoff machine or other machine to which the bar feeder supplies bars.

The bar 46 is formed of a hardened steel to provide the desired wearing characteristics and has a smooth upper surface engaging the rollers of the roller chain. The unique arrangement of the blocks 41 makes it easy to replace the bar 46 when it is worn out. It will be noted that the bar 46 is adjusted in unison with the box beam 1 and the sprockets 10 and 11 so that adjustment of its vertical position does not require readjusting the tension in the conveyor chain or readjusting the conveyor drive means.

Pusher means and various other means may be provided to effect longitudinal feeding of bars from the bar feeder. Such pusher means are disclosed for example in copending application Ser. No. 633,868 filed Apr. 26, 1967, now U.S. Pat. No. 3,493,625, and copending application Ser. No. 600,350 filed Nov. 22, 1966 now U.S. Pat. No. 3,480,159. The chain 12 may be driven as disclosed in those applications or reciprocated if this is necessary or desirable. In the specific bar feeder illustrated in FIGS. 1 to 8 the conveyor is driven in only one direction, and means are provided for placing a bar $b$ against the upper flight of the conveyor chain to create a friction which drives the bars forwardly. This is effected by a unique holddown assembly B which is shown in FIGS. 1, 2 and 3.

The assembly B has a vertically adjustable metal frame 52, which is rigidly mounted on the box beam 1, and includes three vertical legs 53 welded to a horizontal top bar 54. A series of arms 62 are pivotally connected to the top bar 54 by horizontal pivot pins 56 and are held in parallel positions by a horizontal operating bar 55, which is parallel to the bar 54 and is pivotally connected to arm 62 by horizontal pivot pins 57. There is thus provided a parallel linkage which causes the three arms 62 to swing in unison when they are moved. A cylindrical holddown roller 58 is rotatably mounted on the end of each arm 62 by means of a stub shaft 63. These rollers may be lowered into engagement with a bar $b$ as shown in FIG. 3 and may be raised to an elevated position as shown in FIG. 1.

A pneumatic cylinder 59 or other motor means may be provided to effect movement of the rollers 58. As herein shown a lateral support plate 60 is welded to the upper bar 54 of the frame 52 and is provided with a pair of brackets 61 which pivotally support the cylinder 59. The piston rod of said cylinder is pivotally connected to an extension member 64, which is rigidly connected to one of the arms 62. With this arrangement the rollers 58 are raised in response to extension of the piston rod and are lowered into engagement with the bar $b$ on the conveyor in response to retraction to the piston rod.

The holddown assembly B engages the underlying bar $b$ at several places so as to straighten the bar and provide maximum friction between the bar and the rollers of the conveyor chain 12. This provides a more positive drive and reduces the time required to accelerate the bar to the speed of the conveyor when it initially moves onto the chain. However, the friction drive will provide the necessary slippage to prevent stalling of the motor 16 if there is a malfunction which stops forward movement of the bar. It is not necessary to use a stall-torque motor for the conveyor.

The positive grip provided by the holddown assembly B also makes it possible to reverse the electric motor 16 when it is desired to reverse the feed and to pull the bar out of the machine to which it was being fed. This is important, for example, in a hot nut-forming machine where the bar must be removed from the heating zone whenever there is a malfunction to avoid melting of the bar.

The friction drive provided by the assembly B makes it possible to use random lengths of bars *b* which would not be suitable if the drive were effected by pushers as disclosed in the aforesaid applications Ser. No. 633,868.

The frame F is constructed to provide means for storing a large number of bars *b* and for feeding them laterally to the conveyor A. A feed ramp is preferably provided so that the bars are fed by gravity down a line toward the conveyor. The bar feeder of this invention has a unique feed ramp including a rigid feed ramp frame 66 which has five aligned ramp bars 67 welded to a pair of longitudinal bars 68 and 69 which extend the full length of the frame 66 and substantially the full length of the frame F. A rod 70 of circular cross section is rigidly mounted on the top of each ramp bar 67. The upper surface of the five ramp rods 70 are in alignment and located in a common plane, which is spaced from the upper surfaces of the bars 68 and 69 a distance equal to the diameter to each rod 70. The rod 70 can be made of wood, rubber, plastic or other nonmetallic material. As herein shown, it is made of steel and held in place by a series of spaced spot welds 71.

In order to prevent sagging of small diameter bars *b* between the widely spaced rods 70, it is often desirable to provide additional ramp rods on the ramp frame 66. Removable ramp rods 72 are provided for this purpose. Each rod 72 is of circular cross section and has a diameter equal to the rod 70, so that its upper surface will be in the same plane as the upper surfaces of the other rods 70 when it rests on the bars 68 and 69. Means are provided for detachably connecting each rod 72 to the bar 68. As herein shown an L-shaped bracket 73 is welded to each rod 72 and fits around the bar 68 as shown in FIG. 8. The rod 72 may be placed midway between two of the ramp bars 67 as shown in FIG. 2 or may otherwise be located along the length of the feed ramp frame. The auxiliary ramp rods are particularly important when feeding bars *b* of random length, some of which are not long enough to reach the outer bar 67. The auxiliary rods prevent sagging of the ends of such short bars and also prevent bars of small diameter from sagging between the bars 67.

The rods 70 and 72 provide smooth line contact to reduce the rolling friction and to provide smoother rolling of the bars down the ramp. This makes it possible to employ the proper ramp angles and to avoid excessive ramp angles which may tend to cause cascading or improper feeding with bars of a certain type.

The feed ramp frame 66 is pivotally mounted on the frame F by five horizontal pivot pins 74 having a common horizontal axis parallel to the surface 44. The pivot pin 74 extends through each ramp bar 67 into the associated horizontal support 6 at the side of the associated leg 2 nearest the box beam 1. The feed ramp frame 66 is mounted to swing vertically from a lowered position as shown in solid lines in FIG. 4 to a raised position as shown in broken lines in that FIG. The raising and lowering of the frame 66 is preferably effected by a series of mechanical or fluid-operated jacks because of the substantial weight of the bars *b*, especially when handling bars of large diameter. As herein shown five jacks 76 are provided, which are similar to the jacks 27 previously described and are operated in a similar manner by a common operating rod 77 which extends the full length of the frame F as shown in FIG. 2. Said rod is rotated by a hand crank 78 similar to the crank 29.

Each jack 76 may be a conventional screw jack and may be the same as the jack 27 previously described. Each jack 76 has a base cylinder or housing 79 which is pivotally mounted on the adjacent horizontal support 4 by a horizontal pivot pin 80. A similar horizontal pivot pin 75 extends through the associated ramp bar 67 parallel to the pivot axis 74. The pin 75 pivotally connects the lifting rod portion 81 of the jack to the feed ramp frame 66. The five jacks 76 are identical and are mounted in the same way so that the rods 81 are raised and lowered in unison in response to rotation of the operating rod 77 to maintain the pivot pins 75 in horizontal alignment parallel to the axis of the pivot pins 74. Thus, the feed ramp frame 66 may be raised to the position shown in broken lines in FIG. 4 to receive the bars *b* on the flat horizontal upper surfaces 82 of the members 7.

When feeding solid bars of small diameter the feed ramp frame 66 may be elevated as shown in dot-dash lines in FIG. 4. This increases the rate of feeding by gravity and provides the feed ramp angle which is most desirable. However, when feeding large diameter bars of great weight it is important to reduce the angle by lowering the jacks 79 to the positions shown in solid lines in FIG. 4. The selection of the proper ramp angle reduces the chances for malfunction or improper feeding.

The bars *b* are fed from the feed ramp one at a time to the conveyor A, the remaining bars being held against movement by the upper portions 36 of the bars 35. In order to provide the proper operation, the upper portion 36 of each bar 35 is provided with a steeply inclined bar-engaging surface 83 suitable for engaging large diameter bars *b* as shown in FIG. 6 and with a flat inclined upper surface 84 which may be substantially perpendicular to the flat surfaces 83.

A narrow horizontal bar 86 is provided to prevent small bars from falling between the conveyor chain and the bars 35. The bar 86 has an inclined upper surface 85 positioned to engage a small bar *b* to guide it onto the upper flight of the conveyor chain. Such surface 85 is located to clear a large bar as indicated in FIG. 6 but is very close to the chain 12. The bar 86 may extend the full length of the frame F. As herein shown, it is supported on the box beam 1 by a plurality of narrow vertical bars 87 which are rigidly mounted on the box beam by screws 34 and may be welded to the beam.

The bar feeder of the present invention has a novel escapement mechanism C which includes a series of escapement arms 92 and escapement members 108 which engage the end bar *b* to lift it over the bars 35 and push it toward the conveyor chain. These arms are rigidly mounted on an escapement arm shaft 88 having a keyway which receives a key 89. The shaft 88 extends the full length of the frame F and is rotatably supported in a horizontal position parallel to the box beam 1 by a series of bearings at 90 carried by the five supporting members 6 of the frame. Each bearing support 90 is held in position by screws 91.

Each escapement arm 92 has a hub block 93 keyed to the shaft 88 and extends laterally from the shaft 88 to a position adjacent the box beam 1. One of the arms 92 is pivotally connected to the piston rod 95 of a pneumatic or hydraulic operating cylinder 94. A bifurcated connecting member 96 is mounted on a horizontal pivot pin 97 which extends through the arm 92. At the opposite end of the pneumatic cylinder there is a similar pivotal connection including brackets 99 carried by a horizontal plate 100 and a pivot pin 98 extending through the brackets and into the lower end portion of the cylindrical housing.

The plate 100 is detachably and rigidly connected by bolts 101 to a bracket 102 of L-shaped cross section having a vertical portion 107 which is welded to the adjacent leg 2.

A horizontal rectangular plate 103 is welded to the bottom of a frame member 6 and projects therefrom as shown in FIG. 7. The plate is internally threaded to receive an adjustable vertical stop screw having a lock nut 105 to hold it in its adjusted positions. The screw 104 is vertically aligned with the adjacent escapement arm 92 so that its upper surface 106 will engage the bottom of the arm when the piston 95 is retracted. As all of the arms 92 are rigidly mounted on one shaft 88, the screw 104 adjusts the stop position for all of the escapement arms. All of these arms are the same and are mounted in the same manner on the shaft 88 so that they remain in alignment at all times. The key 89 extends the full length of the shaft 88 so that any of the arms 92, except the one connected to cylinder 94, may be adjusted axially to different positions on the shaft 88 when this is desired.

Each arm 92 has adjustable means for supporting an escapement member 108 having a triangular upwardly projecting portion 111 for engaging a bar *b* to lift it over the stops at 36.

As herein shown, each member 108 has two parallel inclined slots 109 of a size to receive two clamping screws 110 which screw into the arm 92. The flat inclined upper surface 112 of portion 111 is parallel to the slots 109. An auxiliary escapement member is welded to the end of each arm 92 on the side opposite the member 108 and has a triangular upper end portion 114 with a flat inclined upper surface 115 located in the same plane as the upper surfaces 112 of the several members 108. When the members 108 are adjusted for relatively large bars as shown in FIG. 6, the surfaces 115 and 112 combine to provide the wide bar-engaging area needed for lifting and feeding of the large bars. Yet the members 113 do not interfere with adjustment of the members 108 for feeding of small diameter bars.

The frame F is open at the back so that a forklift truck may carry a bundle of bars b to a position over the storage rack at 7 and discharge the bundle. The bars b from the bundle roll from the storage rack onto the feed ramp, the lowermost bar engaging the stop members 35 to hold the single row of bars b on the ramp.

When operation of the bar feeder is initiated and the conveyor A is operating, the cylinder 94 is actuated to raise the escapement arms 92 and move the sharply inclined surfaces 112 against the lowermost bar b at the stops 35, thereby lifting such bar and pushing it upwardly and outwardly toward the moving conveyor chain 12.

The uppermost point of each escapement member 108 at the top of its flat vertical rear surface 116 is located between the axis of that bar and the axis of the next adjacent bar so that the member 108 exerts a force on said next bar in a direction away from the stop 35. The surface 116 holds the remaining bars of the row against movement while each member 108 moves to a position higher than its associated stop 35 and pushes the first bar over the stops onto the moving conveyor chain 12. The bar can roll on the surfaces 84 and 85 as it moves toward the chain.

The vertical movement of the members 108 is limited to avoid contact with the bottom of the remaining row of bars so that they remain on the feed ramp. As soon as the escapement arms are lowered to move the surface 116 out of contact with the lowermost bar of the row, that bar is released to roll against the stops 35.

As soon as one bar moves onto the moving chain 12, a limit switch 150 is tripped to initiate lowering of the holddown rollers 58 which takes places in a fraction of a second. This accelerates the bar b and rapidly brings it up to the speed of the conveyor.

The forward movement of the bar is momentarily interrupted each time it is cut by the impact shear, but this does not interfere with movement of the conveyor because the friction drive permits slippage when the bar is stopped.

When the rear end of the bar b passes the limit switch 50, that switch is tripped to effect raising of the holddown rollers 58 and to cause operation of the escapement cylinder 94 to initiate a second cycle and to feed one more bar onto the conveyor. The cycle is repeated each time the switch 50 is tripped.

The above operations may be performed manually but are preferably performed automatically by conventional electrical controls. Such controls are well known and are disclosed, for example, in said copending applications Ser. No. 600,350 and Ser. No. 633,868 and in my copending application Ser. No. 793,005, filed Jan. 22, 1969.

The stop 104 is preferably adjusted to position the escapement fingers 108 as close as possible to the feed ramp so that the time delay is minimized and the bar is fed to the chain as fast as possible. The setting of the stop 104 is different when the fingers 108 are adjusted for a different size bar.

Whenever the bar size is changed, the feed ramp angle may quickly be adjusted by turning the crank 78 and the height of the conveyor chain may be adjusted by turning the crank 29 so that the axis of the bar on the conveyor is properly located relative to the impact shear machine or other machine receiving the bar.

The machine of this invention is particularly advantageous because of its ability to handle bars of widely varying diameters. For example, the machine shown herein can handle bars with a diameter of about three-eights inch up to about 2 inches.

The screws 110 are loosened to permit adjustment of the escapement members 108 to the proper position so that they will lift one bar only from the feed rack. It will be apparent, however, that the escapement means of this invention can be adopted to feed several bars to the conveyor during each escapement operation where the conveyor is designed to receive more than one bar.

It will be understood that, in accordance with the provisions of the patent laws, variations and modifications of the specific devices disclosed herein may be made without departing from the spirit of the invention.

I claim:

1. A high speed bar and tube feeder comprising a conveyor (A) for receiving a bar and feeding it axially, means (9) for driving said conveyor, holddown means (B) for pressing the bar against the conveyor (12) to effect driving of the bar, a rigid feed rack frame (F) having a stop member (35) contiguous to and out of contact with said conveyor and having a feed ramp (66) inclined downwardly toward said stop member for supporting a row of long parallel bars in positions parallel to said conveyor, said stop member (35) engaging the lowermost bar of the row to hold the bars against rolling, an adjustable escapement finger (108) having an inclined surface (112) engageable with said lowermost bar for lifting said bar over said stop member, said surface being inclined in a direction to push the bar toward said conveyor, means (94) for moving said escapement finger (108) upwardly between said lowermost bar and the next adjacent bar of the row to effect feeding of said lowermost bar to the conveyor, and means (59) for lowering said holddown means after the bar is on the conveyor.

2. A bar feeder as defined in claim 1 wherein a series of said escapement fingers (108) are mounted for movement in unison to engage the bar at space location along its length, each finger having a generally triangular upper end portion 111 and means (109, 110) for adjusting the position of said end portion in accordance with the diameter of the bars on the feed ramp.

3. A bar feeder as defined in claim 2 wherein each escapement finger (108) is adjustably mounted on a vertically movable escapement member 92 having an auxiliary escapement member (113) with an inclined surface (115) aligned with the inclined surface (112) of the escapement finger (108).

4. A bar feeder as defined in claim 3 wherein each escapement finger (108) has an adjusting slot (109) parallel to the inclined surface of said auxiliary escapement member (113) and a clamping screw (110) mounted in said slot for connecting the finger to said vertically movable escapement member (92).

5. A bar feeder as defined in claim 3 wherein said vertically movable member is an escapement arm extending laterally toward said conveyor and rigidly mounted on a shaft parallel to said conveyor.

6. A bar feeder as defined in claim 5 wherein an adjustable stop (104) is mounted on said frame (F) for engaging the escapement arm to limit downward swinging movement of the arm, said stop being located to position the top of each escapement finger adjacent to the lowermost bar of the feed ramp.

7. A bar feeder as defined in claim 1 wherein said feed ramp (66) is mounted to swing about an axis (at 76) adjacent to said stop member (35), and means are provided for supporting the feed ramp in adjusted positions.

8. A bar feeder as defined in claim 7 wherein the feed ramp (66) is adjusted by a series of jacks having a common operating shaft for elevating the jacks uniformly.

9. A high speed bar and tube feeder comprising a chain conveyor (A) for receiving a bar and feeding it axially, means (9) for driving said conveyor, holddown means (B) for pressing the bar against the conveyor chain (12) to effect driving of the bar, a rigid feed rack frame (F) having a stop member (35) contiguous to and out of contact with said conveyor and having a feed ramp (66) inclined downwardly toward said stop member for supporting a row of long parallel bars in positions parallel to said conveyor chain, said stop member (35) engaging the lowermost bar of the row to hold the bars against rolling, an adjustable escapement finger (108) having an inclined surface (112) engageable with said lowermost bar for lifting said bar over said stop member, said surface being inclined in a direction to push the bar toward said conveyor chain, means (94) for moving said escapement finger (108) upwardly between said lowermost bar and the next adjacent bar of the row to effect feeding of said lowermost bar to the conveyor, and means (59) for lowering said holddown means after the bar is on the conveyor.

10. A bar feeder as defined in claim 9 wherein said conveyor (A) has front and rear sprockets (10 and 11) rotatably mounted in a long box beam (1) which forms the principal reinforcing element of the frame (F) and which is mounted to slide vertically on said frame, the conveyor chain (12) mounted on said sprockets having an upper flight mounted on a guide bar (46) carried by the top of the box beam, and motor means (9) are mounted on said box beam to drive said conveyor.

11. A bar feeder as defined in claim 10 wherein guide means (38, 39) are provided for holding the box beam (1) against the frame (F) adjacent the stop member (35) and for guiding it as it slides vertically and wherein a series of jacks are mounted to support said box beam and to adjust it vertically 12. A bar feeder as defined in claim 11 wherein a common operating shaft is provided to elevate all of the jacks in unison.

13. A bar feeder as defined in claim 9 wherein said holddown means (B) comprises a frame (52) having a plurality of arms (62) mounted for vertical swinging movement, means (55) for maintaining the arms in parallel positions, bar-engaging rollers (58) mounted on said arms, and motor means (59) for lowering the roller against a bar on said conveyor and for lifting the rollers to permit feeding of a bar under the rollers.